United States Patent
Pfaffenberger et al.

[15] 3,697,179
[45] Oct. 10, 1972

[54] LIGHT MEASURING DEVICE

[72] Inventors: Erwin Pfaffenberger; Hans Försterling, both of Erlangen, Germany

[73] Assignee: P. Gossen & Co. G.m.b.H., Erlangen, Bavaria, Germany

[22] Filed: Jan. 18, 1971

[21] Appl. No.: 107,584

Related U.S. Application Data

[63] Continuation of Ser. No. 631,947, April 19, 1967, abandoned.

[30] Foreign Application Priority Data

Oct. 29, 1966    Germany..........P 15 47 309.3

[52] U.S. Cl. ................356/73, 356/220, 356/224, 356/225
[51] Int. Cl. ...........................G01n 21/00, G01j 1/42
[58] Field of Search........................356/221–226, 73; 24/230 A–230 M

[56] References Cited

UNITED STATES PATENTS

| | | | |
|---|---|---|---|
| 2,982,174 | 5/1961 | Crandell | 356/73 |
| 3,421,821 | 1/1969 | Alessi | 356/186 |
| 3,237,264 | 3/1966 | Turolla | 24/230 A–M |
| 2,584,440 | 2/1952 | Fogle | 356/224 |
| 2,585,245 | 2/1952 | Harrison | 356/73 |
| 2,995,975 | 8/1961 | Balchunas et al. | 356/222 X |
| 3,360,656 | 12/1967 | Kinnard | 356/73 X |

FOREIGN PATENTS OR APPLICATIONS

| | | | |
|---|---|---|---|
| 156,695 | 8/1939 | Austria | 356/224 |
| 356,503 | 2/1938 | Italy | 356/275 |

OTHER PUBLICATIONS

Gossen, PSA J., December 1966, pp. 10–11

*Primary Examiner*—Ronald L. Wibert
*Assistant Examiner*—Warren A. Sklap
*Attorney*—Nolte & Nolte

[57] ABSTRACT

The present disclosure relates to a universally applicable light measuring device, especially photometer, which comprises a main measuring device, e.g., an exposure meter, and a plurality of easily exchangeable auxiliary measuring devices or adapters which, when individually attached to the main measuring device, form therewith new unitary devices, as to outer appearance and function. All adapters have identical bottom portions with two hook-like extensions to be received in corresponding recesses in the main measuring device. One of the extensions is resiliently journalled and may be displaced by a push button for disconnecting the adapter from the main device.

Various new adapters are proposed, as for instance, an adapter for reducing the measuring angle, a dark room adapter, an adapter for determining the exposure time when taking micro-photographs, a focusing screen scanner, an adapter which transforms the main measuring device into an illumination meter, an adapter for determining the "color temperature" when taking color photographs, and an adapter for making densitometric measurements.

3 Claims, 11 Drawing Figures

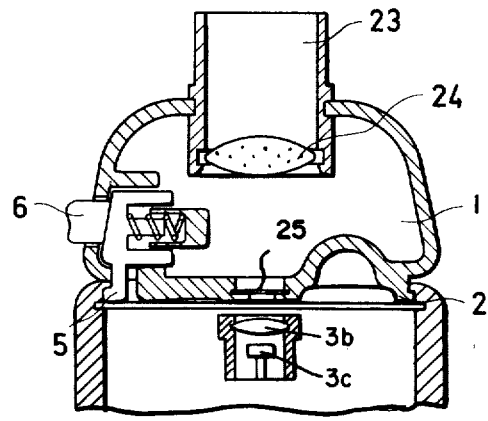
Fig. 7
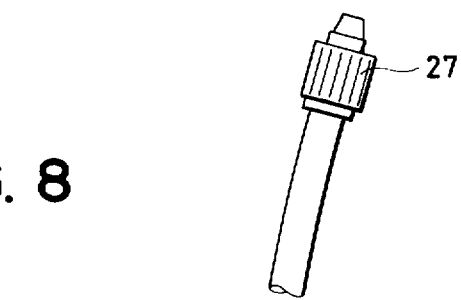
FIG. 8
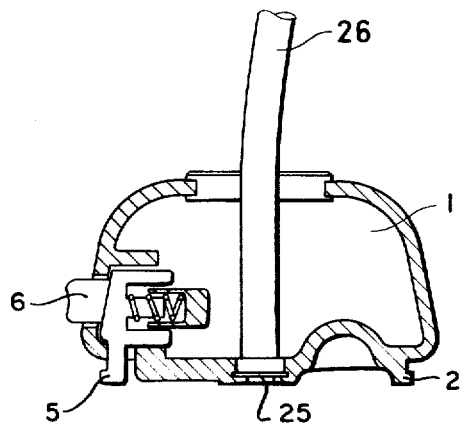
INVENTORS
ERWIN PFAFFENBERGER
HANS FÖRSTERLING
BY *Nolte & Nolte*
ATTORNEYS

LIGHT MEASURING DEVICE

This application is a continuation of Ser. No. 631,947, filed Apr. 19, 1967, now abandoned.

SUMMARY OF THE INVENTION

The present invention relates to a universally applicable photometer, especially for carrying out phototechnical measurements. It comprises a main measuring device and a plurality of adapters or auxiliary measuring devices, which can be connected to the main or basic device by identical means in such a way that a new and unitary device as to appearance and function is created while permitting easy exchange. The main device by itself or in combination with the various adapters may be used to carry out a number of different photometric measurements.

In order to solve the problems involved as to appearance and function, it was necessary to design the adapters to be combined with the main device so that upon assembly a unitary device is produced. To this end all adapters are provided with the same connecting device or arrangement which permits exchange in a very simple manner. The connecting device is not apparent at the main or basic device since the latter is to be used also without the adapters. In addition, care had to be taken that a diffusor which is non-detachably but displaceably connected to the main device, is located outside the path of the rays, to be measured during use of the adapters, bodily and functionally. Moreover, the individual elements of the combination have to be adapted to the physical properties of the main device, which operates as an exposure meter.

It is an object of the present invention to provide a composite light measuring device, especially a photometer, which is universally applicable for carrying out a large number of photometric measurements.

It is another object of the present invention to provide a light measuring device as set forth above which comprises a main measuring device and a plurality of exchangeable auxiliary measuring devices which can easily be connected to and detached from the main measuring device.

Still another object consists in the provision of cooperating means for connecting the auxiliary measuring devices, one at a time, to the main measuring device.

According to still another object of this invention, novel auxiliary measuring devices or adapters are proposed for reducing the measuring angle of an objective, for use in the dark room while making enlargements, for making micro-photographs, for scanning focussing screen images, for determining the "color temperature" of objects, or for carrying out densitometric measurements, and others.

The present invention is illustrated by way of example in the following drawings, in which:

FIG. 7 is a cross section through an adapter for use in the making of micro-photographs;

FIG. 8 illustrates a cross section through a focussing screen scanner according to the present invention;

For connection to the main measuring device, all adapters have an identical bottom with a stationary hook-like extension and a resilient movable nose portion adapted to engage recesses at the top of the exposure meter. The resilient nose portion may be depressed by a key accessible from the outside and, therefore, permits a fast exchange. Furthermore, a recess for the above-mentioned diffusor is provided which, upon attachment of an adapter is displaced in such a way that it occupies a position in this recess.

Figure 1:
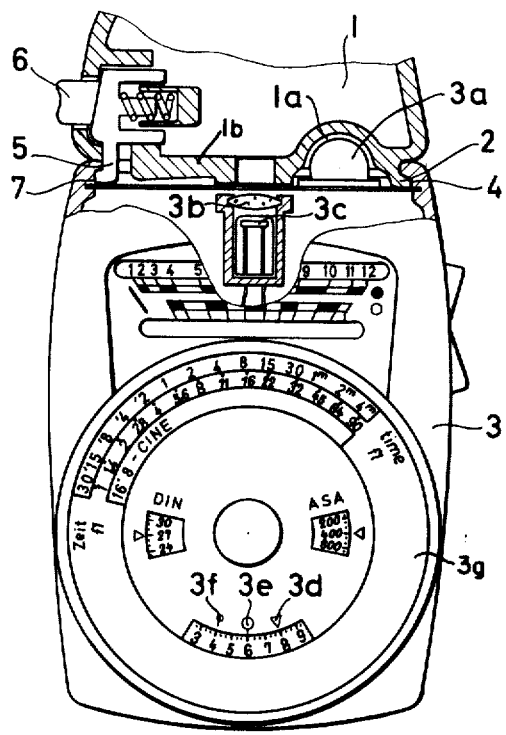
FIG. 1 is a front view, partly in section, of an exposure meter with an adapter.

The connecting device proper, according to FIG. 1, comprises an extension 2 in the form of a hook and arranged at the bottom 1b of housing 1 of the adapter. Extension 2 slides into a recess 4 at the top of the main device 3 when the adapter is attached to the latter. A resilient nose 5 with a key 6 adapted to be actuated by hand from the outside is arranged opposite extension 2. Nose 5 is resiliently held in housing 1 of the adapter and is caught in a second recess 7 of main device 3. In this way, the main device and the adapter are fixedly connected to each other. For purposes of disconnecting the adapter from the main device, key 6 is depressed whereby the adapter may easily be detached. Prior to the connection of the adapters to the main device the diffuser 3a is slidably displaced so that it is located below the depression 1a of the adapter and is received therein.

The main device 3 proper, i.e., the exposure meter in the embodiment shown, has the customary measuring angle of approximately 30°, in other words, is somewhat smaller than the picture angle of an objective of normal focal distance. In order to be able to measure with smaller measuring angles which correspond to the picture angles of ordinary teleobjectives, as, for instance, with an angle of 15° or 7.5° the path of the rays has to be reduced to the desired value by means of an adapter and a variable aperture of a diaphragm.

The structure of this adapter for reducing the measuring angle has to be such that a compact unit and light losses as small as possible are obtained. The optical structure comprises three parts, viz, two convex or collecting lenses and a variable or adjustable diaphragm which is arranged between the two lenses close to the lens on the exit side. As an optimum solution, the lens on the entrance side is so designed that it produces an image of the distant objects in the plane of the diaphragm. The focal distance $f_1$ of this lens and the aperture of the diaphragm with the radius $a$ are so dimensioned that the desired acceptance angle $\alpha$ satisfies the condition:

$$\tan \alpha = a/f_1$$

The focal distance of the lens on the exit side is so selected that the opening or aperture of the lens on the entrance side appears on a reduced scale on a photoconductive cell or photoresistance of the main or basic measuring device. This image is produced, according to FIG. 1, with the cooperation of the lens 3b on the entrance side, which is anyhow present in the main device. The variable diaphragm is formed by a slide with two different size diaphragm apertures. Furthermore, an optical view finder is incorporated in the housing of the measuring angle reducing adapter, since it is very difficult without this aid to sight the object to be measured accurately when small measuring angles are involved.

Figure 2:
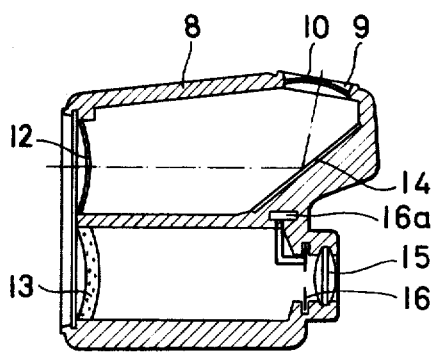
FIG. 2 is a cross section of an adapter for reducing the measuring angle of the exposure meter, and taken along the line 2 — 2 of FIG. 3.
Figure 3:
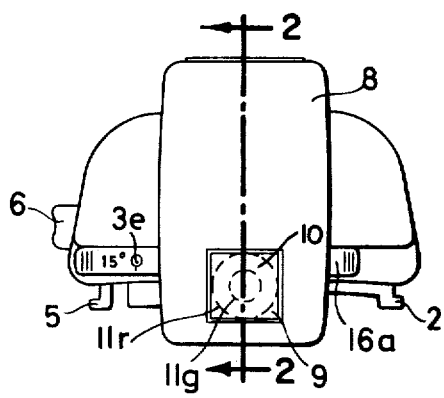
FIG. 3 is a top view of the adapter of FIG. 2.

The just-mentioned adapter for reducing the measuring angle is shown in FIG. 2 in longitudinal section and in FIG. 3 in top view. It comprises a housing 8 with a viewing opening 9 for the view finder, which is covered by a small glass plate 10. Two annular, colored grooves 11r and 11g are ground into this plate and indicate in the view finder the limits of the respective measuring angle in color (red and green). Two lenses 12 and 13 are arranged on that side which faces the object being measured. Lens 12 in combination with a deviating mirror 14 serves as finder and produces images of distant objects on the small glass plate 10, whereas lens 13 and lens 15, in combination with disc diaphragm 16 arranged adjacent lens 15, serve as actual measuring angle limiting means. Diaphragm 16 has two apertures corresponding to the measuring angles 15° and 7.5° and is adjustable from the outside by means of a slide 16a diagrammatically illustrated in FIGS. 2 and 3. When reading the exposure values on the main device and when adjusting the calculating ring 3g according to FIG. 1, a reading mark 3e or 3f which is offset with regard to the main reading mark 3d is to be used because of the light loss in view of the reduction of the measuring angle to 15° and 7.5° respectively. The symbols corresponding to these marks have been transferred to slide 16a and are visible in the corresponding position of the latter (see FIG. 3). It is, of course, to be understood that instead of the two measuring angles of 15° and 7.5°, selected by way of example also three or more angles with different values may be accommodated in the diaphragm 16.

The present invention also proposes a new adapter which may be employed as dark room adapter for determining the exposure period required when making enlargements. With such a device it is necessary to deviate the light falling on the plane of the paper by 90° into the horizontal light entrance of the exposure meter, without light losses. In the present instance, this is accomplished by correspondingly bent or curved light conductors. In order to solve the problem involved it is further necessary that the height of the adapter corresponds approximately to the thickness of the exposure meter housing for design reasons since a larger distance between the measuring plane and the plane of the paper of the easel would automatically cause a measuring error in view of the increase of the luminous intensity with the square of the distance, at smaller spacings from the light source. In this connection, the distance of the center of the light entrance opening at the exposure meter from the abutment surface is predetermined.

In view of the fact that the light entrance opening at the adapter is spaced from the opening in the exposure meter, the entering pencil or bundle of light rays passes through both openings with full strength only if the measurement is carried out with the light entering perpendicularly, or if the opening in the adapter is smaller than that in the exposure meter. If the light enters at an incline light is lost and errors occur. The other possibility, viz, to make the opening at the adapter smaller, is unsuitable since a considerable light loss would be encountered. The same holds true for the application of a light diffuser in the entrance opening of the adapter. This problem can, however, be solved, by means of light conductors if the light impinges on the measuring plane in a direction deviating from the perpendicular in the marginal zones. It has been found that the light conductors may have a round or rectangular cross section and may not drop below a minimum radius of curvature $\rho$ and a certain diameter or cross section respectively in case transparent plastic material is used since the maximum angle under which the light enters and which may be accommodated depend thereon. In order to assure that, up to a certain maximum angle of incidence, all light entering the opening of the light conductor is transmitted by total reflection, it is necessary that the radius of curvature remains $\rho \geq d/a$.

Figure 4:
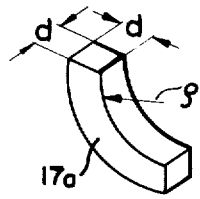
FIG. 4 is a light conductor for use in one of the adapters according to the present invention.

As shown more in detail in FIG. 4, $d$ represents the length of the edge of the square light conductor 17a or the diameter of a corresponding round light conductor, $a$ being a value defined by the formula:

$$a = \sqrt{n^2 - \sin^2\beta} - 1$$

in which $n$ is the index of refraction of the material of the light conductor and $\beta$ the angle of incidence. As a practical application with $\beta = 30°$ and $n = 1,492$ (Plexiglass) and $d = 2$mm (or cross section 2×2mm.), Consequently, if the minimum radii of curvature remain larger than 4.9mm., all light entering the light conductor is deviated by 90° and reaches the photoresistance 30 of the exposure meter.

Figure 5:
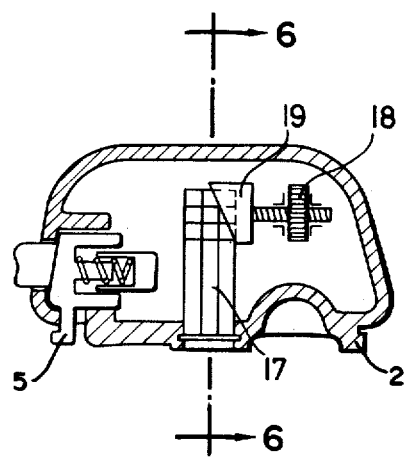
FIG. 5 is a cross section through an adapter for use in the dark room.
Figure 6:
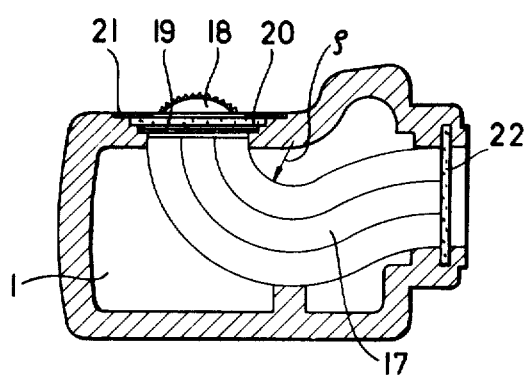
FIG. 6 is a section taken along the line 6 — 6 of FIG. 5, at twice the scale of FIG. 5.

When taking into consideration these conditions and the requirement that the total height of this dark room adapter, i.e., the distance between the measuring plane and the working plane has to be as low as possible, the structure of this adapter as shown in FIGS. 5 and 6 is obtained. Incidentally, FIG. 5 shows once more a part of the above-described connecting device. The individual nine light conductors 17 which are made from transparent (clear) plastic material have a square cross section in the embodiment shown. The one ends of these conductors are directed perpendicularly to the light inlet opening and are adapted to be partially covered by a diaphragm 19 which is adjustable by means of a knurled wheel 18. A glass plate 20 protects the light conductors from dust. A white surface 21 is provided around the light inlet opening so that one can clearly recognize in which part of the projected image the inlet opening is located. The other end of the light conductors, which is directed perpendicularly to the inlet opening of the exposure meter is provided with a further protecting glass plate 22. The requirement of maintaining the minimum radius $\rho$ makes it necessary to bend the light conductors twice, in opposite directions, in order to keep the height of the adapter at a minimum.

In accordance with the present invention, another adapter is suggested which serves for determining the exposure time when taking micro-photographs. If all light that fills the cross section of the eyepiece tube of a microscope is to reach the measuring opening or aperture of the exposure meter, the lens provided in the adapter has to project an image of the opening of the objective of the microscope into the opening of the exposure meter.

According to FIG. 7, the micro-adapter comprises a microscope tube 23 which fits for instance into an eyepiece tube of a microscope. A convex lens 24 is connected to that end of tube 23 which is recessed into the adapter. The exit opening of this adapter is sealed against dust by a small glass plate 25 and has such a size that as little light as possible is lost along its path from lens 24 to the light inlet opening of the exposure meter. As before, the housing of the adapter is provided with the above-described connecting device, including elements 2, 5, and 6.

In conformity with the present invention, there is furthermore provided an adapter which may serve as a focussing screen scanner by means of which the focussing screen image of a camera may be scanned point by point, in any desired manner. This has been accomplished by inserting a light conductor made from flexible glass fibers of appropriate length into a housing which is similar to that of the micro-adapter of FIG. 7. The free end of this "fiber optics" may be placed onto the point of the focussing screen to be measured, by means of a handle in the form of a sleeve. The scanned section of the image is directed into the inlet lens of the exposure meter through the flexible light conductor. It is not necessary to employ an expensive "fiber optics" in which the fibers are arranged in orderly fashion, for obtaining a correct reproduction of the image, since an optical reproduction is not required. For the present purpose the transmission of the light by means of a fiber optics with unoriented fibers (light conductor) is sufficient. The employment of such an arrangement yields considerable advantages over the heretofore known measuring methods. Among these are: only a very small section of the picture or image is scanned at a time and the scanning end of the fiber optics is small and can be handled easily.

The focussing screen scanner is shown in FIG. 8. It comprises a housing 1 which serves for holding the fiber optics 26. The fiber optics proper is provided with a handle 27 in the form of a sleeve. By means of this flexible light conductor it is possible to scan the focussing screen image of a camera for all practical purposes point by point.

Figure 9:
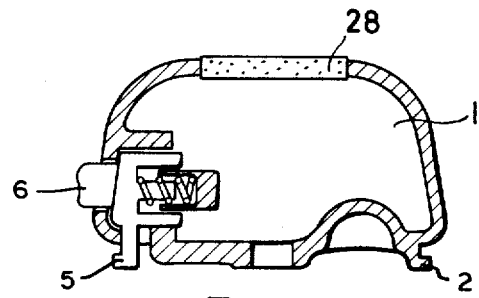
FIG. 9 shows an adapter which, when combined with the exposure meter of FIG. 1, forms a luxmeter.

FIG. 9 illustrates an adapter which transforms the main or basic device of FIG. 1 into an illumination meter. This adapter likewise comprises a housing 1 with the previously described connecting means 2, 5 and 6. The top of the housing has inserted therein a rectangular plane alabaster or milk glass disc 28. In this way, in combination with the main measuring device 3 an illumination meter has been created which may be employed for instance for measuring the light intensity of work places.

Figure 10:
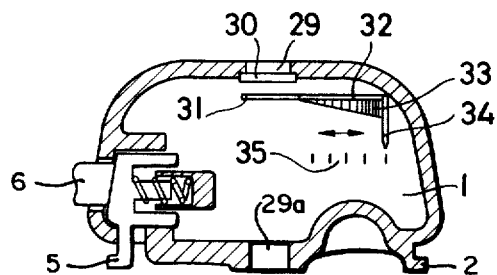
FIG. 10 shows a cross section of an adapter for determining the "color temperature" of color photographs.

FIG. 10 shows an adapter for determining the "color temperature" in color photography. Housing 1 has its top provided with a light inlet opening 29 including a glass disc 30. A slide with a red and blue filter 31 and 32 is arranged in the path of light from inlet opening 29 to outlet opening 29a. A neutral wedge 33 is connected to one of the filter discs. The slide is furthermore provided with a manually operable indicator 34 which is displaceable along a scale 35 having "color temperature" values indicated thereon.

For purposes of determining the "color temperature," or which adapters or front filters are required, in a manner known per se, the filter slide is first adjusted in such a way that only the red filter 31 is arranged in the path of the light rays. The deviation of the needle of the exposure meter 3 (not shown in FIG. 10) is determined. Thereafter the slide is displaced until the blue filter 32 together with the neutral wedge filter 33 produces the same deviation of the needle. The amount of the displacement of the neutral wedge is a measure for the blue-red-portion, i.e., for the color temperature. Subsequently, the color temperature can be read on scale 35.

Figure 11:
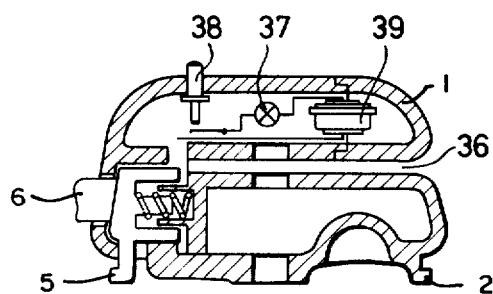
FIG. 11 represents a cross section of an adapter for carrying out densitometric measurements.

Densitometric measurements can be carried out with an adapter according to FIG. 11. For this purpose, the negative to be examined is inserted into a slot 36 of the adapter housing 1. During the inserting movement it will extend into the path of light rays of a small incandescent lamp 37 which, through the intervention of a key 38 is connected to a battery 39 and thereby emits light onto the light sensitive element 3c of exposure meter 3 (FIG. 1) when the adapter is attached to the latter. It is possible, from the number of gray shadings which are readable at the exposure meter 3, to determine the greatest and smallest density values of the negative, i.e., the contrast of the negative. In this way, it may be predetermined whether a hard or soft paper is to be used for an enlargement or for a copy.

While in some of the figures of the drawing the adapters have been shown by themselves, it is to be understood that each of them has to be connected to the main measuring device 3 as shown in FIG. 1 to form therewith a complete, operable unit.

Although the invention has been described with reference to specific embodiments thereof, it is not intended to limit the invention to such specific embodiments alone, but it should be interpreted in the scope of the appended claims.

What is claimed is

1. A light measuring device for phototechnical measurements comprising in combination an exposure meter and an auxiliary device for modifying light to be applied to said exposure meter, said exposure meter having a light entrance aperture on one surface thereof, an extension surrounding said one surface and forming recesses adjacent opposite sides of said one surface, and a diffuser slidably mounted with respect to said one surface whereby said diffuser may be moved into and out of alignment with said light entrance aperture, said auxiliary device having a bottom surface that conforms to the extension of said exposure meter, a fixed protrusion extending from the bottom surface and for engaging a first one of the recesses in said extension, and a movable protrusion for engaging a second one of said recesses opposite said first one of the recesses for holding said bottom surface of said auxiliary device against said extension of said exposure meter, said auxiliary device further having an aperture aligned with said light entrance aperture, manually actuatable resilient means urging said movable protrusion into said second one of the recessed for interconnecting said exposure meter and auxiliary device, actuating means for moving said movable protrusion against the thrust of said resilient means for detaching said auxiliary device upon actuation of said actuating means, said auxiliary device further having a recess formed therein out of alignment with said light entrance aperture and conforming to the shape of said diffuser, whereby said auxiliary device may be mounted on said exposure meter only when said diffuser is aligned with the recess in the bottom of said auxiliary device.

2. The light measuring device of claim 1 wherein said first and second recesses are constituted by opposed parts of a recess in the extension surrounding said one surface of said exposure meter and extending around the circumference of said one surface, thereby to constitute guide means for guiding the movement of said diffuser into and out of alignment with said light entrance aperture.

3. The light measuring device of claim 1 wherein said diffuser is dome shaped and extends from said one surface beyond said extension, whereby said first and second recesses in the bottom of said auxiliary measuring device hold said diffuser out of alignment with said light entrance aperture when said auxiliary measuring device is mounted on said exposure meter.

* * * * *